United States Patent
Nagaoka et al.

(10) Patent No.: US 9,562,463 B2
(45) Date of Patent: Feb. 7, 2017

(54) CONTROL METHOD FOR EXHAUST GAS AFTERTREATMENT DEVICE

(71) Applicant: ISUZU MOTORS LIMITED, Tokyo (JP)

(72) Inventors: Daiji Nagaoka, Kamakura (JP); Teruo Nakada, Yokohama (JP); Hiroyuki Yuza, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/771,847

(22) PCT Filed: Mar. 5, 2014

(86) PCT No.: PCT/JP2014/055607
§ 371 (c)(1),
(2) Date: Oct. 26, 2015

(87) PCT Pub. No.: WO2014/136832
PCT Pub. Date: Sep. 12, 2014

(65) Prior Publication Data
US 2016/0061085 A1   Mar. 3, 2016

(30) Foreign Application Priority Data
Mar. 7, 2013  (JP) .................. 2013-045265

(51) Int. Cl.
*F01N 9/00* (2006.01)
*F01N 3/08* (2006.01)
(Continued)

(52) U.S. Cl.
CPC .............. *F01N 9/002* (2013.01); *F01N 3/023* (2013.01); *F01N 3/0232* (2013.01);
(Continued)

(58) Field of Classification Search
CPC ...... F02D 41/029; F01N 9/002; F01N 3/0842; F01N 13/02; F01N 3/035
(Continued)

(56) References Cited

U.S. PATENT DOCUMENTS

2006/0010856 A1* 1/2006 Audouin ............. F02D 41/0245
  60/285
2008/0216467 A1* 9/2008 Bruck ................ B01D 53/9409
  60/286

(Continued)

FOREIGN PATENT DOCUMENTS

JP     2006-342735     12/2006
JP     2006342735 A  * 12/2006
(Continued)

OTHER PUBLICATIONS

PCT International Preliminary Report on Patentability dated Sep. 8, 2015 in corresponding International Patent Application No. PCT/JP2014/055607.

(Continued)

*Primary Examiner* — Patrick Maines
(74) *Attorney, Agent, or Firm* — Staas & Halsey LLP

(57) ABSTRACT

A diesel oxidation catalyst, a NOx occlusion reduction catalyst, and a diesel particulate filter are connected to an exhaust pipe of an engine, downstream of an exhaust pipe injector provided on the exhaust pipe. NOx in the exhaust gas is occluded by the NOx occlusion reduction catalyst when an air-fuel ratio is lean. The occluded NOx is reduced and purified when the air-fuel ratio is rich. When a prescribed amount of particulate matter has accumulated in the diesel particulate filter, the exhaust gas temperature is raised when performing particulate matter regeneration. The exhaust gas temperature is further raised to perform a sulphur purge. The rich condition is prohibited during the particulate matter regeneration period and the sulphur purge (Continued)

period. When the sulphur purge is completed, the rich condition prohibition continues until the difference between the inlet temperature of the diesel oxidation catalyst and the outlet temperature of the NOx occlusion reduction catalyst becomes equal to or less than a predetermined threshold.

13 Claims, 5 Drawing Sheets

(51) Int. Cl.
| | |
|---|---|
| *F01N 3/20* | (2006.01) |
| *F01N 3/025* | (2006.01) |
| *F01N 13/00* | (2010.01) |
| *F01N 3/023* | (2006.01) |
| *F01N 3/035* | (2006.01) |
| *F01N 3/10* | (2006.01) |
| *F01N 11/00* | (2006.01) |
| *F01N 3/36* | (2006.01) |

(52) U.S. Cl.
CPC .......... *F01N 3/0253* (2013.01); *F01N 3/035* (2013.01); *F01N 3/0814* (2013.01); *F01N 3/0842* (2013.01); *F01N 3/0871* (2013.01); *F01N 3/0885* (2013.01); *F01N 3/103* (2013.01); *F01N 3/208* (2013.01); *F01N 3/2066* (2013.01); *F01N 3/2073* (2013.01); *F01N 9/00* (2013.01); *F01N 11/002* (2013.01); *F01N 13/009* (2014.06); *F01N 3/36* (2013.01); *F01N 2610/02* (2013.01); *F01N 2610/03* (2013.01); *F01N 2900/1602* (2013.01); *F01N 2900/1606* (2013.01); *Y02T 10/24* (2013.01); *Y02T 10/47* (2013.01)

(58) Field of Classification Search
USPC .......... 60/273, 274, 285, 286, 295, 301, 311
See application file for complete search history.

(56) References Cited

U.S. PATENT DOCUMENTS

| | | | |
|---|---|---|---|
| 2012/0186235 A1* | 7/2012 | Yamamoto | ............ F01N 13/009 60/274 |
| 2014/0352279 A1* | 12/2014 | Gonze | ..................... F01N 3/021 60/274 |

FOREIGN PATENT DOCUMENTS

| | | | | |
|---|---|---|---|---|
| JP | EP 1818522 A1 | * | 8/2007 | ......... B01D 53/9495 |
| JP | 2008281005 A | * | 11/2008 | |
| JP | 4474775 | | 6/2010 | |
| JP | 2010-229929 | | 10/2010 | |
| JP | 2011094572 A | * | 5/2011 | |
| JP | 2012017731 A | * | 1/2012 | |

OTHER PUBLICATIONS

Patent Abstracts of Japan, Publication No. 2006-342735, published Dec. 21, 2006.
Patent Abstracts of Japan, Publication No. 2010-229929, published Oct. 14, 2010.
Espacenet Bibliographic data, Publication No. 4474775, published Jun. 9, 2010.
International Search Report mailed Apr. 22, 2014, in corresponding International Application No. PCT/JP2014/055607.
Extended European Search Report dated Sep. 22, 2016 in corresponding European Patent Application No. 14760529.9.

* cited by examiner

CONTROL METHOD FOR EXHAUST GAS AFTERTREATMENT DEVICE

CROSS-REFERENCE TO RELATED APPLICATIONS

This application is a U.S. National Stage Application, which claims the benefit under 35 U.S.C. §371 of PCT International Patent Application No. PCT/JP2014/055607, filed Mar. 5, 2014, which claims the foreign priority benefit under 35 U.S.C. §119 of Japanese Patent Application No. 2013-045265, filed Mar. 7, 2013, the contents of which are incorporated herein by reference.

TECHNICAL FIELD

The present invention relates to a method of controlling an exhaust gas aftertreatment device after particulate matter (PM) regeneration or sulphur purge is carried out in the exhaust gas aftertreatment device.

BACKGROUND ART

Diesel oxidation catalyst (DOC) systems, diesel particulate filter (DPF) systems, NOx occlusion catalyst (lean NOx trap (LNT) or NOx storage reduction (NSR)) systems, urea selective catalytic reduction (SCR) systems, and so on are in practical use for exhaust gas aftertreatment devices of diesel engines.

The DOC system and the DPF system are effective systems for reducing PM. Although the DOC, which is provided at an upstream position in the exhaust passage, is not capable of oxidizing solid soot, the DOC oxidizes a large portion of soluble organic fraction (SOF), which accounts for 30 to 70% of the total PM, and also removes hydrocarbon (HC) and CO at the same time. The DPF, which is provided at a downstream position, is formed of porous ceramics or the like having a fine pore size and captures a large portion of the PM contained in the exhaust gas.

A NOx occlusion reduction catalyst is constituted by a catalyst carrier of alumina ($Al_2O_3$) or the like, with a noble metal catalyst (e.g., Pt and Pd) and an occlusion material having a NOx occluding property (e.g., alkali metal including Na, K, and Cs, an alkaline-earth metal including Ca and Ba, and a rare earth including Y and La) supported on a surface of the catalyst carrier. The NOx occlusion reduction catalyst exhibits a function of either occluding NOx or discharging and purifying NOx depending on the oxygen concentration in the exhaust gas.

With a purification system having the NOx occlusion reduction catalyst, when the oxygen concentration in the exhaust gas is high (lean air-fuel ratio) as in a normal driving condition, NO in the exhaust gas is oxidized into $NO_2$ by the noble metal catalyst or the like, such as Pt and Pd, and the occlusion material stores $NO_2$ in the form of a nitrate ($Ba(NO_3)_2$) so as to purify NOx.

However, if the occlusion material continues to occlude (collect and retain) NOx, the occlusion material becomes saturated with the nitrate and loses its occlusion property. Thus, the driving condition is altered, and exhaust gas recirculation (EGR), post-injection of fuel, or exhaust pipe injection is carried out in a condition of low oxygen concentration to produce a rich state, and the fuel is reduced over the noble metal catalyst so as to produce CO, HC, and $H_2$ in the exhaust gas. Thus, NOx is reduced, discharged, and purified.

In this manner, the purification system having the NOx occlusion reduction catalyst stores NOx when the air-fuel ratio is lean (when the oxygen concentration is high), and reduces and purifies the stored NOx when the air-fuel ratio is rich.

The NOx occlusion reduction catalyst adsorbs and stores SOx contained in the exhaust gas in addition to NOx. Unlike NOx, SOx cannot easily be desorbed. In order to release S from the occlusion material, the ambient temperature of the catalyst is raised to a high temperature (no less than 650 degrees C.) and the air-fuel ratio is controlled to be rich. This changes $Ba_2SO_4$ to carbonate+$SO_2$, and desulfurization is achieved. Therefore, the NOx occlusion reduction catalyst needs to be regenerated by carrying out desulfurization control (S purge) at predetermined driving-distance intervals. During the S purge, an amount of EGR is set greater than that in a normal state and the air-fuel ratio is brought close to the stoichiometric ratio. Thus, an amount of emitted NOx becomes smaller due to a reduction in the NOx concentration at the exit of the engine and a ternary function. Therefore, a problem of NOx does not worsen.

When a selective catalytic reduction (urea SCR) unit is used, an amount of emitted NOx at the exit of the engine is reduced by reducing an amount of air intake during the PM regeneration. Therefore, a problem of NOx does not worsen.

LISTING OF REFERENCES

Patent Literatures

PATENT LITERATURE 1: Japanese Patent No. 4474775
PATENT LITERATURE 2: Japanese Patent Application Laid-Open Publication (Kokai) No. 2010-229929

However, when the PM regeneration or the S purge finishes, normal air-based control resumes, and an amount of emitted NOx at the exit of the engine increases to a normal level. Although the worsening of the NOx problem can temporarily be prevented by the effect of NOx occlusion, the NOx occlusion reduction catalyst is at a high temperature immediately after the S purge. Thus, the occlusion performance is low, and a rich treatment is carried out more frequently than normal, which may lead to problems, i.e., the fuel economy drops and the exhaust gas is deteriorated due to HC slip in the rich state.

When the selective catalytic reduction (urea SCR) is used, the SCR unit (SCR catalyst) is at a high temperature immediately after the PM regeneration. Thus, the NOx reducing performance is low. If a urea solution (urea water) is sprayed as in a normal condition, there arises a problem, i.e., $NH_3$ that is not used in reduction slips.

Conventionally, these problems occur immediately after the S purge or the PM regeneration for a very short period of time, and thus countermeasures have not been taken.

However, as exhaust gas regulations indicate strict values, even such small problems can no longer be overlooked in order to improve Ki (value that reflects the rate at which exhaust gas deteriorates due to PM regeneration or the like onto a deterioration factor of a catalyst). Accordingly, the countermeasures against the stated problems, which momentarily cause the exhaust gas and the fuel economy to deteriorate, need to be taken.

When a lean NOx trap (LNT) catalyst is used, rich reduction is not carried out for a specified time interval after the S purge. This is disclosed in PATENT LITERATURE 1. PATENT LITERATURE 1 cannot ensure appropriate control because the temperature of the catalyst changes as an amount of heat that dissipates from the catalyst varies depending on external disturbances, such as the outer temperature, the vehicle speed, and the air passing therethrough. For example, the temperature of the catalyst decreases quickly during high-speed travelling, but it takes more time for the temperature of the catalyst to decrease during low-speed travelling.

PATENT LITERATURE 2 discloses a urea SCR unit, and a DPF is regenerated when an amount of ammonia adsorbed on the SCR unit falls below a predetermined threshold in order to prevent an occurrence of ammonia slip during the PM regeneration. However, the ammonia slip that could occur as a urea solution is sprayed after the PM regeneration finishes is not taken into consideration.

SUMMARY OF THE INVENTION

Accordingly, an object of the present invention is to solve the above-described problems and to provide a method of controlling an exhaust gas aftertreatment device that can precisely control the timing at which a rich state resumes after the S purge and/or the timing at which a urea solution is sprayed after the PM regeneration.

To achieve the above-mentioned object, the present invention provides a method of controlling an exhaust gas aftertreatment device. The exhaust gas aftertreatment device includes an exhaust pipe injector provided in an exhaust pipe of an engine, and also includes a DOC connected to the exhaust pipe downstream of the exhaust pipe injector, a NOx occlusion reduction catalyst connected to the exhaust pipe downstream of the exhaust pipe injector, and a DPF connected to the exhaust pipe downstream of the exhaust pipe injector. The exhaust gas aftertreatment device is configured to store NOx contained in exhaust gas with the NOx occlusion reduction catalyst when an air-fuel ratio is lean, and to reduce and purify the stored NOx when the air-fuel ratio is rich. The method of controlling the exhaust gas aftertreatment device includes raising an exhaust gas temperature when a predetermined amount of PM has accumulated in the DPF so as to carry out PM regeneration. After the PM regeneration, the method also includes further raising the exhaust gas temperature to apply S purge to the sulfur adsorbed on the NOx occlusion reduction catalyst. The method also includes prohibiting a rich state (rich reduction) during the PM regeneration period and the S purge period. After the S purge is completed, the method also includes continuing to prohibit the rich state until a difference between an inlet temperature of the DOC and an outlet temperature of the NOx occlusion reduction catalyst reaches or falls below a predetermined threshold.

Setting the difference between the inlet and outlet temperatures of the catalyst as a threshold for starting the rich state (rich reduction) makes it possible to accurately monitor that the catalyst heated due to the PM regeneration or the S purge has been moderated and the NOx occlusion performance (capability) has recovered to allow the rich state. This threshold is preferably set within a range of 80 to 100° C. It is preferred that rich reduction be carried out when the difference between the inlet and outlet temperatures of the catalyst has reached or fallen below the threshold and after a minimum rich-prohibited period or more has passed. It is also preferred that rich reduction be carried out when the difference between the inlet and outlet temperatures of the catalyst exceeds the threshold and after a maximum rich-prohibited period has passed since the difference between the inlet and outlet temperatures of the catalyst has exceeded the threshold. The threshold of the temperature is obtained through an experiment, and normal control can be achieved within this range. If a temperature is higher than the threshold, the NOx occlusion performance is not fully recovered. If a temperature is lower than the threshold, the rich-prohibited period becomes longer than necessary.

According to another aspect of the present invention, there is provided is another method of controlling an exhaust gas aftertreatment device. The exhaust gas aftertreatment device includes an exhaust pipe injector provided in an exhaust pipe of an engine, and also includes a DPF connected to the exhaust pipe downstream of the exhaust pipe injector, an SCR unit connected to the exhaust pipe downstream of the DPF, a DOC connected to the exhaust pipe downstream of the DPF, and a urea solution (urea water) spray nozzle provided in the exhaust pipe upstream of the SCR unit. The exhaust gas aftertreatment device is configured to reduce and purify NOx with the SCR unit. The method includes raising an exhaust gas temperature when a predetermined amount of PM has accumulated in the DPF so as to carry out PM regeneration while prohibiting the spraying of the urea solution from the urea solution spray nozzle. After the PM regeneration finishes, the method also includes continuing to prohibit the spraying of the urea solution until a difference between inlet and outlet temperatures of the SCR unit reaches or falls below a threshold.

The threshold is preferably set within a range of 80 to 100° C. It is preferred that the urea solution be sprayed when the difference between inlet and outlet temperatures of the SCR unit has reached or fallen below the threshold and after a minimum urea-solution-spray-prohibited period or more has passed. It is also preferred that the urea solution be sprayed when the difference between inlet and outlet temperatures of the SCR unit exceeds the threshold and after a maximum urea-solution-spray-prohibited period has passed since the difference between inlet and outlet temperatures of the SCR unit has exceeded the threshold.

Limit values are set in the rich-prohibited period and urea-solution-spray-prohibited period. This is a measure to cope with a case in which the temperature difference across the catalyst does not readily reach or fall below the threshold under a certain driving condition.

The present invention prohibits rich reduction from being carried out immediately after the S purge of the NOx occlusion reduction catalyst, and permits the rich reduction upon the exhaust gas temperature at the inlet and the outlet of the NOx occlusion reduction catalyst falling to the threshold. Thus, the present invention can improve the fuel economy during that period. When the PM regeneration is carried out with the SCR unit, the urea solution is sprayed upon the exhaust gas temperature across the SCR unit falling to a threshold. Thus, the present invention can achieve an excellent effect, i.e., it can prevent the ammonia slip.

Hereinafter, exemplary embodiments of the present invention will be described in detail with reference to the accompanying drawings.

Figure 1:
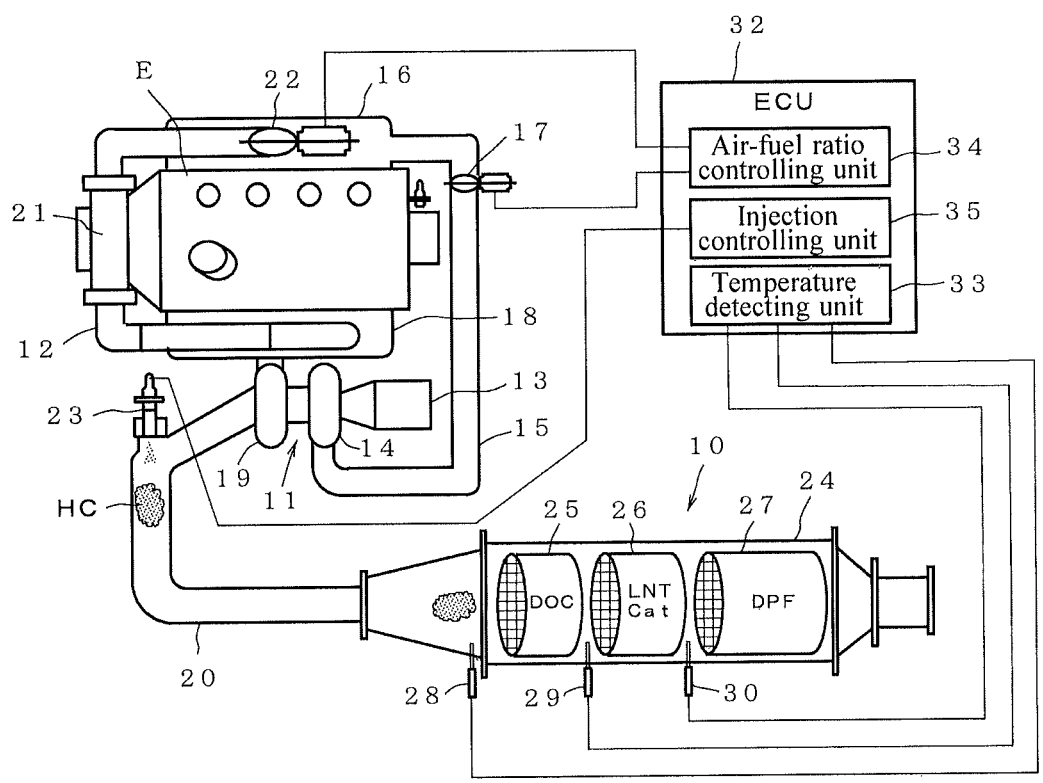
FIG. 1 illustrates a device configuration that is used with a method of controlling an exhaust gas aftertreatment device when the aftertreatment device includes a NOx occlusion reduction catalyst according to an embodiment of the present invention.

FIG. 1 illustrates an exhaust gas aftertreatment device 10 that includes a NOx occlusion reduction catalyst.

A turbocharger 11 and an EGR pipe 12 are connected to an intake part and an exhaust part of an engine E. The air taken in through an air cleaner 13 is compressed by a compressor 14 of the turbocharger 11. The compressed air is sent to an intake passage 15, and supplied into the engine E through an intake manifold 16 of the engine E. An intake valve 17 is provided in the intake passage 15 to regulate an amount of air introduced to the engine E.

An exhaust gas emitted from the engine E is discharged to a turbine 19 of the turbocharger 11 through an exhaust manifold 18 to drive the turbine 19 and discharged to an exhaust pipe 20.

The EGR pipe 12 is connected to the intake manifold 16 and the exhaust manifold 18. An EGR cooler 21 and an EGR valve 22 are connected to the EGR pipe 12. The EGR cooler 21 cools the exhaust gas flowing from the exhaust manifold 18 to the intake manifold 16, and the EGR valve 22 regulates the amount of EGR.

The exhaust gas aftertreatment device 10 has an exhaust pipe injector 23 provided in the exhaust pipe 20 downstream of the turbine 19. The exhaust gas aftertreatment device 10 also has a DOC 25, a NOx occlusion reduction catalyst 26, and a DPF 27 that are canned in this order in a canning receptacle 24. The canning receptacle 24 is formed in the exhaust pipe 20 downstream of the exhaust pipe injector 23.

An exhaust gas temperature sensor 28 is provided upstream of the DOC 25. A catalyst inlet temperature sensor 29 is provided at or near an inlet of the NOx occlusion reduction catalyst 26. A catalyst outlet temperature sensor 30 is provided at or near an outlet of the NOx occlusion reduction catalyst 26.

An ECU 32 controls overall operations (driving) of the engine E. The ECU 32 includes a temperature detecting unit 33, an air-fuel ratio controlling unit 34, and an injection controlling unit 35.

Values detected by the exhaust gas temperature sensor 28, the catalyst inlet temperature sensor 29, and the catalyst outlet temperature sensor 30 are entered to the temperature detecting unit 33 of the ECU 32, which controls the driving of the engine E.

The air-fuel ratio controlling unit 34 controls the EGR valve 22 and the intake valve 17. The injection controlling unit 35 controls the amount of fuel injection of the engine E and multiple-injection, such as post-injection, of the fuel injector. The injection controlling unit 35 also controls fuel HC injected from the exhaust pipe injector 23.

The exhaust gas aftertreatment device 10, which includes the NOx occlusion reduction catalyst, normally stores NOx onto the NOx occlusion reduction catalyst 26 in a lean state (state of the air-fuel ratio being lean). In the meanwhile, the exhaust gas aftertreatment device 10 injects the fuel HC in pulses from the exhaust pipe injector 23 so as to reduce and purify NOx in a rich state (state of the air-fuel ratio being rich).

PM contained in the exhaust gas is captured by the DPF 27. When a predetermined amount of PM has accumulated in the DPF 27, e.g., when a pressure difference across the DPF 27 has reached a prescribed value or when a vehicle has traveled a predetermined distance, the ECU 32 carries out automatic regeneration control on the PM. During this PM regeneration, the exhaust gas temperature is raised to 600 degrees C. by carrying out post-injection or injecting fuel through the exhaust pipe injector 23, and thus the PM that has accumulated in the DPF 27 is burned.

The PM regeneration is carried out at a high exhaust gas temperature (approximately 600 degrees C.) while the rich reduction is being prohibited. After the PM regeneration finishes, the exhaust gas temperature is raised to 605° C. or higher, e.g., approximately 700 degrees C., by injecting fuel through the exhaust pipe injector 23, and S purge is carried out to purge SOx adsorbed on and stored by the NOx occlusion reduction catalyst 26.

Immediately after the S purge treatment of the NOx occlusion reduction catalyst 26, the temperature detecting unit 33 monitors the exhaust gas temperatures directly detected by the exhaust gas temperature sensor 28, the catalyst inlet temperature sensor 29, and the catalyst outlet temperature sensor 30 (in particular monitors the inlet and outlet temperatures of the NOx occlusion reduction catalyst 26 detected by the catalyst inlet temperature sensor 29 and the catalyst outlet temperature sensor 30). Until a difference between the inlet temperature and the outlet temperature of the catalyst 26 reaches or falls below a threshold (value set within a range from 80 to 100 degrees C.), a state in which rich reduction control is suspended (rich prohibition) is continued. The rich reduction is permitted when the difference the inlet temperature and the outlet temperature of the catalyst 26 has reached or fallen below the threshold.

In this manner, the temperatures of the exhaust gas at the inlet and the outlet of the NOx occlusion reduction catalyst 26 are directly detected, and a rich-prohibited period is determined, which enables more appropriate control without being affected by external disturbances than in a case in which the rich-prohibited period after the S purge is set by time. Accordingly, an excessively rich state (excessively rich reduction) is prevented, and the deterioration of exhaust gas due to the deterioration of the fuel economy or HC slip can appropriately be prevented.

In this manner, setting the difference between the inlet and outlet temperatures of the catalyst as a threshold for starting the rich state (rich reduction) makes it possible to accurately monitor that the catalyst heated due to the PM regeneration or the S purge has been moderated and the NOx occlusion performance has recovered to allow the rich state. The threshold of the temperature is obtained through an experiment, and normal control can be achieved within this range. If a temperature is higher than the threshold, the NOx occlusion performance is not fully recovered. If a temperature is lower than the threshold, the rich-prohibited period becomes longer than necessary.

Figure 2:
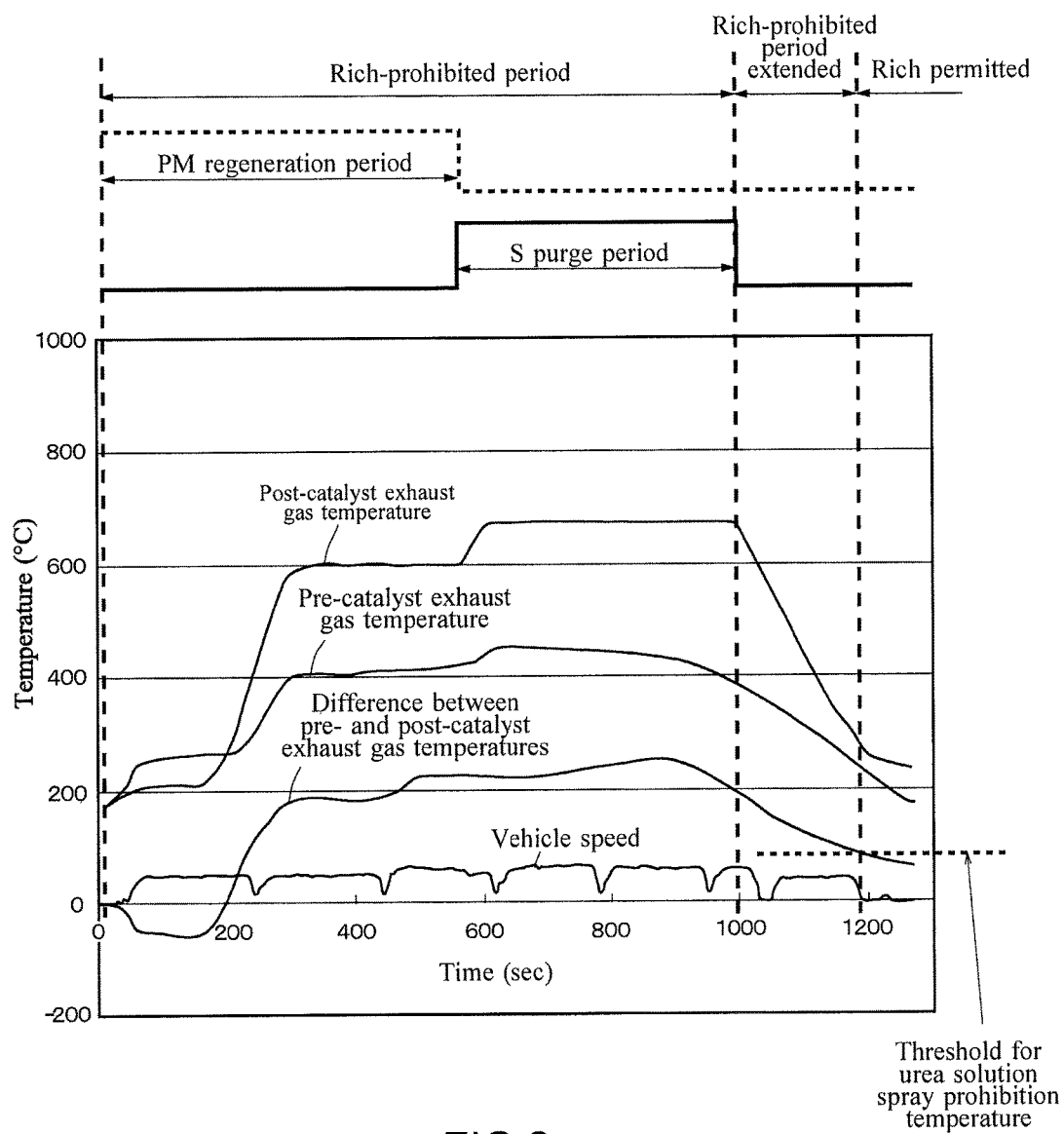
FIG. 2 illustrates changes over time in the exhaust gas temperature at respective parts during PM regeneration and S purge carried out in the device of FIG. 1.

FIG. 2 illustrates changes over time in the temperatures of the exhaust gas at the inlet and the outlet of the NOx occlusion reduction catalyst 26 from the start of the PM regeneration to immediately after the end of the S purge. FIG. 2 also illustrates a change over time in the vehicle speed (0 to 70 km/h).

In FIG. 2, a pre-catalyst exhaust gas temperature is a temperature detected by the catalyst inlet temperature sensor 29, a post-catalyst exhaust gas temperature is a temperature detected by the catalyst outlet temperature sensor 30, and a difference between the pre- and post-catalyst exhaust gas temperatures is a difference between the temperatures detected by the catalyst inlet temperature sensor 29 and the catalyst outlet temperature sensor 30.

In the PM regeneration, the exhaust gas temperature is raised to 600 degrees C. through post-injection or exhaust pipe injection, and the PM that has accumulated in the DPF 27 is burned to regenerate the DPF 27. After the regeneration completes, the exhaust gas temperature is raised to 700 degrees C., and SOx adsorbed on and stored by the NOx occlusion reduction catalyst 26 is purged.

During the PM regeneration period and the S purge period, the rich state is prohibited. When the difference between the pre- and post-catalyst exhaust gas temperatures falls to the threshold after the S purge finishes, the rich state is permitted, and NOx is reduced in a rich condition (where the air-fuel ratio is rich).

Figure 3:
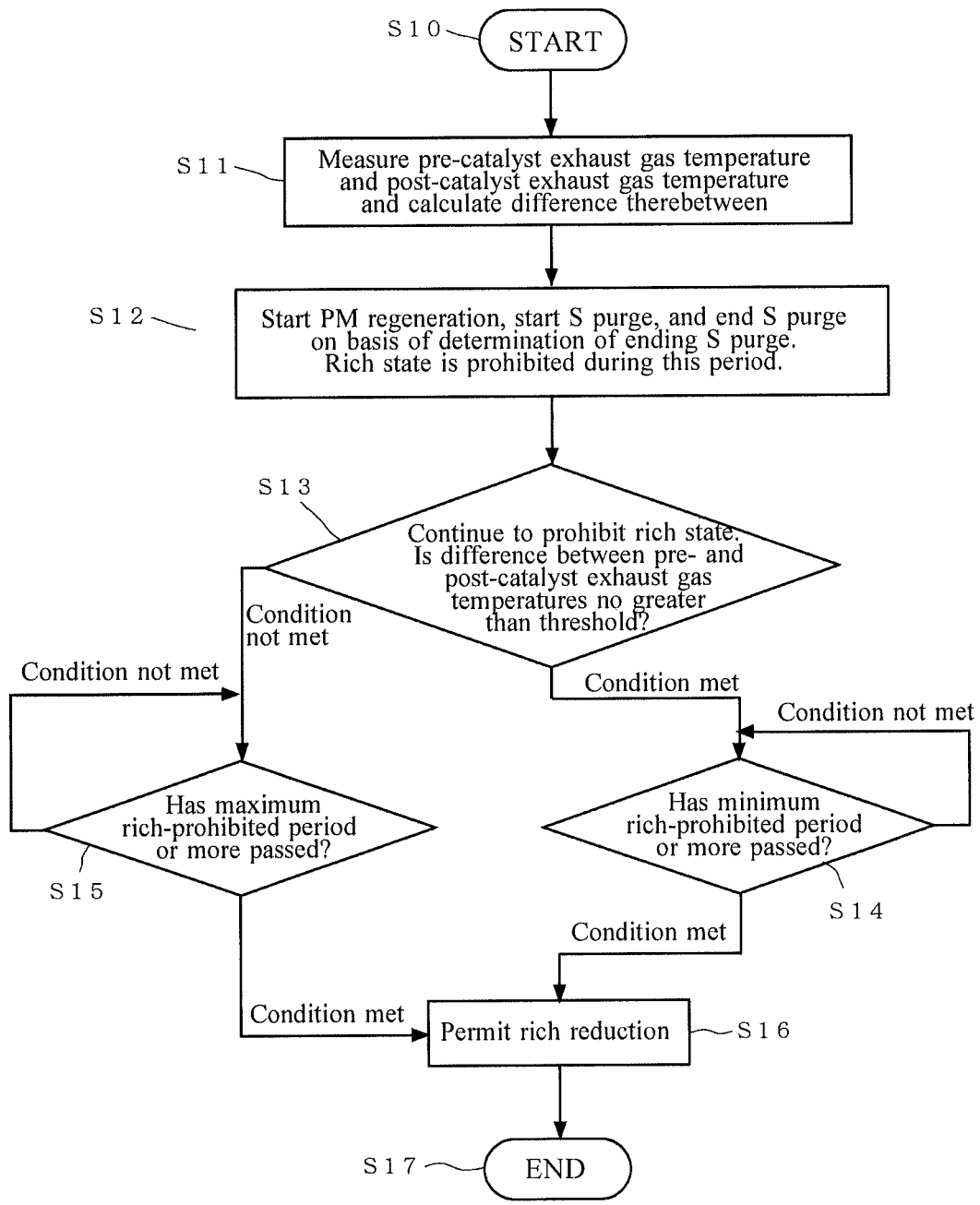
FIG. 3 illustrates a flowchart of the method of controlling the exhaust gas aftertreatment device shown in FIG. 1.

FIG. 3 illustrates a flowchart of a method of controlling the exhaust gas aftertreatment device according to the embodiment of the present invention.

The control starts at Step S10. At Step S11, the pre-catalyst exhaust gas temperature and the post-catalyst exhaust gas temperature are measured, and a difference therebetween is calculated. At Step S12, the PM regeneration starts and then the S purge starts. The S purge ends on the basis of a determination of ending the S purge. The rich state is prohibited during the processing at Step S12.

At Step S13, while the rich state continues to be prohibited, it is determined whether the difference between the pre- and post-catalyst exhaust gas temperatures is no greater than the threshold. If the condition is met, i.e., if the difference is no greater than the threshold, then it is determined at Step S14 whether a minimum rich-prohibited period (e.g., one minute) or more has passed. If the minimum rich-prohibited period or more has passed and the condition is met, rich reduction is permitted at Step S16.

If it is determined at Step S13 that the condition is not met, i.e., the difference is greater than the threshold, it is determined at Step S15 whether a maximum rich-prohibited period (e.g., five minutes) or more has passed. If the maximum rich-prohibited period or more has passed and the condition is met, the rich reduction is permitted at Step S16. Then, the control is terminated at Step S17.

In this manner, it is determined after the S purge whether the difference between the pre- and post-catalyst exhaust gas temperatures is no greater than the threshold, and the rich-prohibited period is selected between the minimum rich period and the maximum rich period on the basis of the temperature difference. Thus, unnecessary fuel injection can be eliminated, and the fuel economy during that period can be improved.

Figure 4:
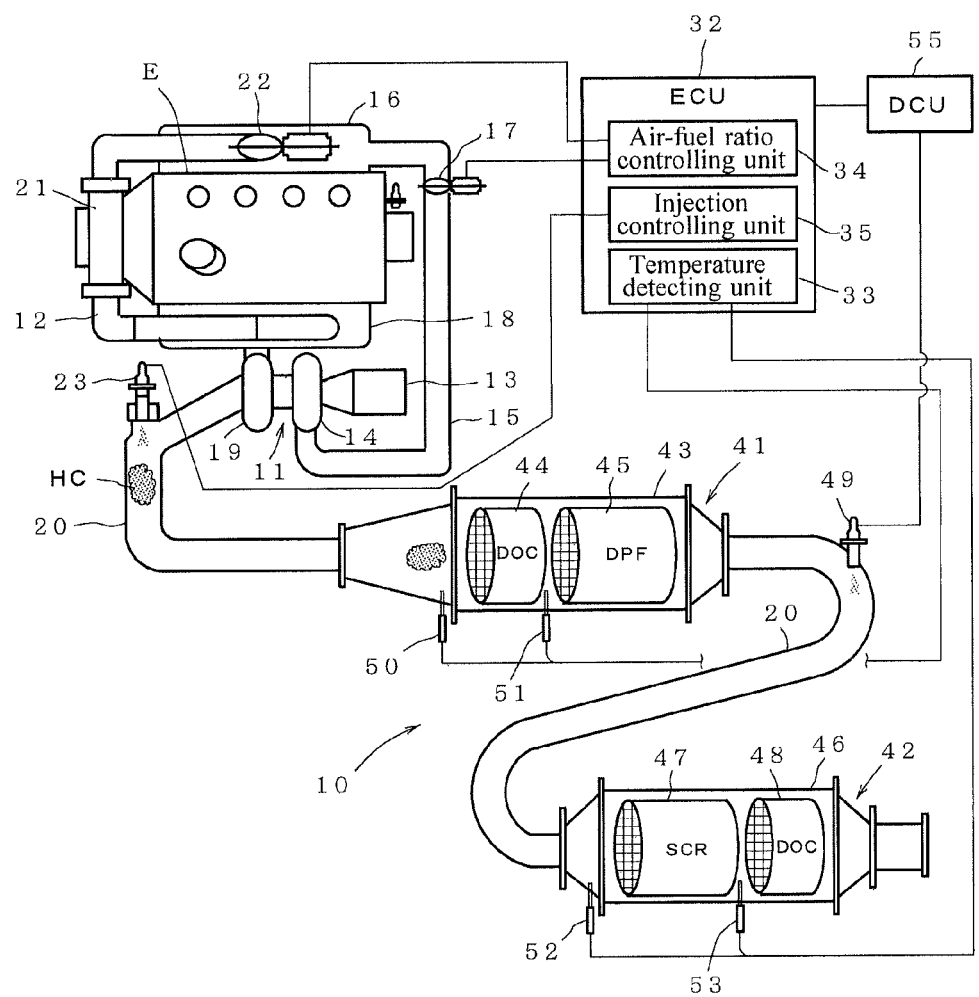
FIG. 4 illustrates a device configuration that is used with a method of controlling an exhaust gas aftertreatment device when the aftertreatment device includes an SCR catalyst according to another embodiment of the present invention.

Referring now to FIG. 4, another embodiment of the present invention will be described.

FIG. 4 illustrates an exhaust gas aftertreatment device 10 that utilizes SCR (or includes an SCR unit (SCR catalyst)). The basic configuration of the engine E except for the configuration of the exhaust gas aftertreatment device 10 is the same as the configuration illustrated in FIG. 1, which will be described again.

The turbocharger 11 and the EGR pipe 12 are connected to the intake and exhaust parts of the engine E. The air taken in through the air cleaner 13 is compressed by the compressor 14 of the turbocharger 11, and the compressed air is fed to the intake passage 15. The air is then supplied to the engine E through the intake manifold 16 of the engine E via the intake valve 17. Exhaust gas emitted from the engine E is discharged to the turbine 19 of the turbocharger 11 through the exhaust manifold 18 to drive the turbine 19 and discharged to the exhaust pipe 20.

The EGR pipe 12 is connected to the intake manifold 16 and the exhaust manifold 18. The EGR cooler 21 and the EGR valve 22 are connected to the EGR pipe 12.

In the exhaust gas aftertreatment device 10, the exhaust pipe injector 23 is provided in the exhaust pipe 20 downstream of the turbine 19. A DPF unit 41 and an SCR unit 42 are provided in the exhaust pipe 20 downstream of the exhaust-pipe injector 23. The DPF unit 41 is constituted by a DOC 44 and a DPF 45. The DOC 44 and the DPF 45 are canned in a DPF canning receptacle 43 formed in the exhaust pipe 20. The SCR unit 42 is constituted by an SCR catalyst 47, a DOC 48 for preventing ammonia slip, and a urea solution (urea water) spray nozzle 49. The SCR catalyst 47 and the DOC 48 are canned in an SCR canning receptacle 46 formed in the exhaust pipe 20. The urea solution spray nozzle 49 is provided in the exhaust pipe 20 upstream of the SCR canning receptacle 46.

An exhaust gas temperature sensor 50 is provided upstream of the DOC 44 of the DPF unit 41, and a DPF temperature sensor 51 is provided at or near an inlet of the DPF 45. An SCR catalyst inlet temperature sensor 52 is provided at or near an inlet of the SCR catalyst 47 of the SCR unit 42, and an SCR catalyst outlet temperature sensor 53 is provided at or near an outlet of the SCR catalyst 47.

The ECU 32 controls overall operations of the engine E. The ECU 32 includes the temperature detecting unit 33, the air-fuel ratio controlling unit 34, and the injection controlling unit 35.

Values detected by the respective temperature sensors 50, 51, 52, and 53 of the exhaust gas aftertreatment device 10 are entered to the temperature detecting unit 33 of the ECU 32, which controls the driving of the engine E.

The air-fuel ratio controlling unit 34 controls the EGR valve 22 and the intake valve 17. The injection controlling unit 35 controls the amount of fuel injection of the engine E and multiple-injection, such as post-injection, of the injector. The injection controlling unit 35 also controls fuel injected from the exhaust pipe injector 23.

The urea solution spray nozzle 49 is controlled by a dosing control unit (DCU) 55 connected to the ECU 32. Although not illustrated, the urea solution spray nozzle 49 sprays (injects) a urea solution in a following manner. A supply module controlled by the DCU 55 takes in the urea solution from a urea solution tank and raises the pressure of the urea solution to a predetermined pressure. The DCU 55 then controls an on-off (open-close) valve in the urea solution spray nozzle 49, and thus the urea solution spray nozzle 49 sprays the urea solution in an amount corresponding to the NOx concentration in the exhaust gas.

The sprayed urea solution undergoes hydrolysis while flowing through the exhaust pipe 20 into the SCR unit 42, and ammonia is produced. The produced ammonia reacts with NOx contained in the exhaust gas with the SCR catalyst 47 such that ammonia is denitrified. Excess ammonia is adsorbed onto the DOC 48, and therefore ammonia slip is prevented.

In the exhaust gas aftertreatment device 10 that includes the SCR catalyst 47, the DPF unit 41 on the upstream side captures the PM included in the exhaust gas, and the SCR unit 42 on the downstream side denitrifies NOx in the exhaust gas.

The PM in the exhaust gas is captured by the DPF 45. When a predetermined amount of PM has accumulated in the DPF 45, the ECU 32 carries out automatic regeneration control on the PM.

During the PM regeneration, the exhaust gas temperature is raised to 600 degrees C. by carrying out post-injection or injecting fuel through the exhaust pipe injector 23, and thus the PM that has accumulated in the DPF 45 is burned.

Immediately after the PM regeneration, the inlet and outlet temperatures of the catalyst in the SCR unit 42 are monitored by the temperature sensors 50 to 53, or in particular by the sensor SCR catalyst inlet temperature sensor 52 and the SCR catalyst inlet temperature sensor 53, and the injection of the urea solution through the urea solution injection nozzle 49 is prohibited until a difference between the inlet temperature and the outlet temperature of the catalyst canning reaches or falls below a threshold (value within a range from 80 to 100 degrees C.).

In other words, the exhaust gas temperature is high immediately after PM regeneration; thus, even if ammonia is supplied to the SCR catalyst 47, a NOx reducing reaction does not occur, and ammonia slip is likely to occur. Therefore, the urea solution spray is suspended until the inlet and outlet temperatures fall within a certain range.

Since the urea-solution-spray-prohibited period is determined directly on the basis of the temperatures, the timing at which the urea solution is sprayed can be controlled more appropriately without being affected by external disturbances than in a case in which the urea-solution-spray-prohibited period after the PM regeneration is set by time. Accordingly, excessive spray of urea solution is prevented, and ammonia slip can be prevented in a more appropriate manner.

Figure 5:
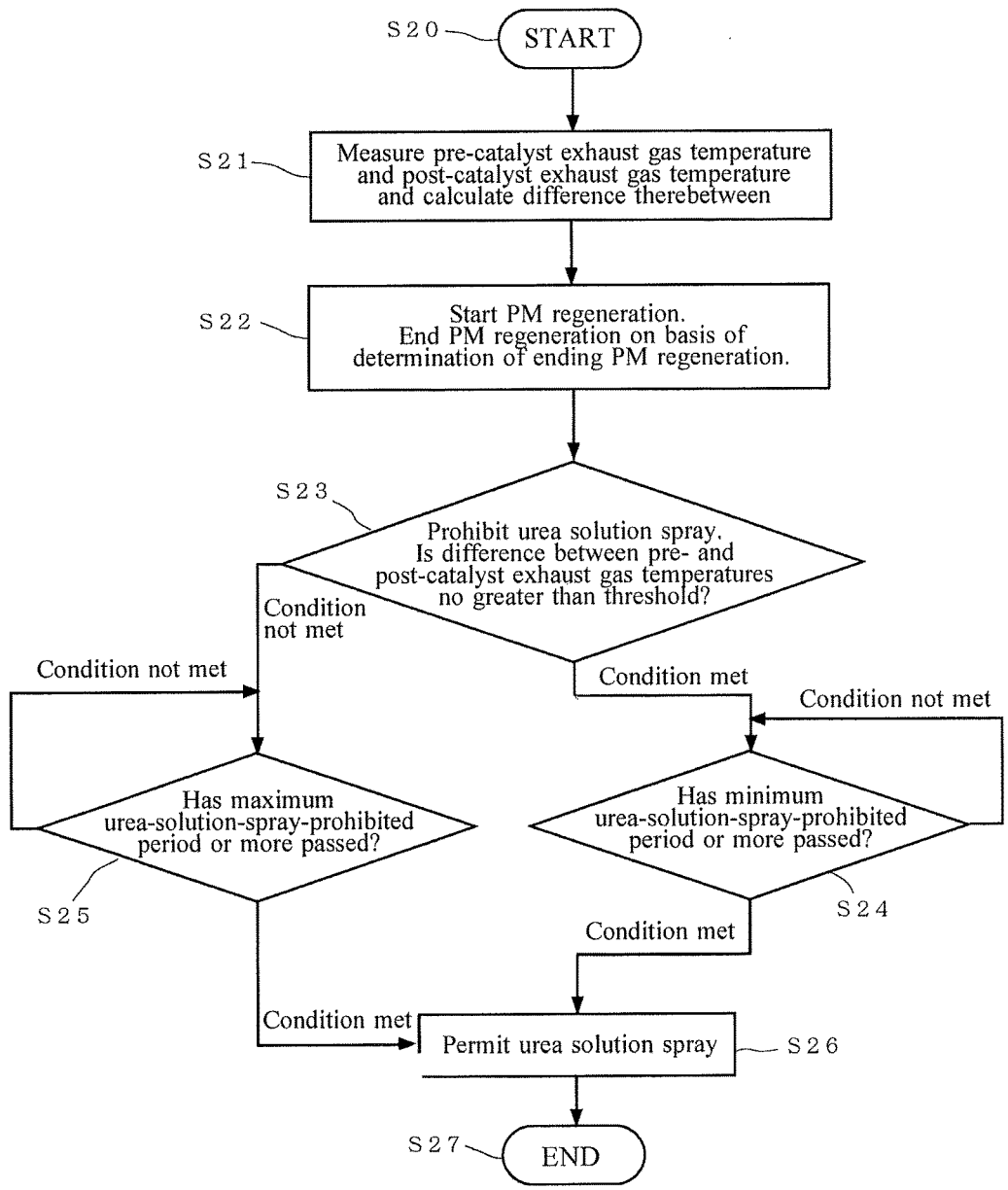
FIG. 5 illustrates a flowchart of the method of controlling the exhaust gas aftertreatment device shown in FIG. 4.

The processing of the PM regeneration and prohibition and permission of urea solution injection immediately after the PM regeneration in the exhaust gas aftertreatment device 10 that includes the SCR catalyst will be described with reference to FIG. 5.

The control (processing) starts at Step S20. At Step S21, the pre-catalyst exhaust gas temperature and the post-catalyst exhaust gas temperature are measured, and a difference therebetween is calculated. At Step S22, the PM regeneration starts and then the PM regeneration ends on the basis of a determination of ending the PM regeneration.

At Step S23, while the urea solution spray continues to be prohibited, it is determined whether the difference between the pre- and post-catalyst exhaust gas temperatures is no greater than the threshold. If the condition is met, i.e., if the difference is no greater than the threshold, it is then determined at Step S24 whether a minimum urea-solution-spray-prohibited period (e.g., one minute) or more has passed. If the minimum urea-solution-spray-prohibited period or more has passed and the condition is met, the urea solution spray is permitted at Step S26.

If it is determined at Step S23 that the condition is not met, i.e., the difference is greater than the threshold, it is then determined at Step S25 whether a maximum urea-solution-spray-prohibited period (e.g., five minutes) or more has passed. If the maximum urea-solution-spray-prohibited period or more has passed and the condition is met, the urea solution spray is permitted at Step S26. Then, the control is terminated at Step S27.

In this manner, it is determined immediately after the PM regeneration whether the difference between the pre- and post-catalyst exhaust gas temperatures is no greater than the threshold, and the urea-solution-spray-prohibited period is selected between the minimum urea-solution-spray-prohibited period and the maximum urea-solution-spray-prohibited period on the basis of the temperature difference. Thus, unnecessary urea solution spray is eliminated, and the ammonia slip during that period can be prevented.

Limit values are set in the rich-prohibited period and urea-solution-spray-prohibited period. This is a measure against a case in which the difference between the temperatures across the catalyst does not readily reach or fall below the threshold under a certain driving condition.

What is claimed is:

1. A method of controlling an exhaust gas aftertreatment device, the exhaust gas aftertreatment device including an exhaust pipe injector provided in an exhaust pipe of an engine, a diesel oxidation catalyst connected to the exhaust pipe downstream of the exhaust pipe injector, a NOx occlusion reduction catalyst connected to the exhaust pipe downstream of the exhaust pipe injector, and a diesel particulate filter connected to the exhaust pipe downstream of the exhaust pipe injector, the exhaust gas aftertreatment device being configured to store NOx contained in an exhaust gas with the NOx occlusion reduction catalyst when an air-fuel ratio is lean, and to reduce and purify the stored NOx when the air-fuel ratio is rich, the method comprising:

raising an exhaust gas temperature when a predetermined amount of particulate matter has accumulated in the diesel particulate filter so as to carry out particulate matter regeneration;

further raising the exhaust gas temperature to carry out a sulphur purge, the sulfur being adsorbed on the NOx occlusion reduction catalyst;

prohibiting a rich state during a particulate matter regeneration period and a sulphur purge period; and continuing to prohibit the rich state, after the sulphur purge is completed, until a difference between an inlet temperature of the diesel oxidation catalyst and an outlet temperature of the NOx occlusion reduction catalyst reaches or falls below a threshold.

2. The method of controlling the exhaust gas aftertreatment device according to claim 1, wherein the threshold is set within a range of 80 to 100 degrees C., and rich reduction is carried out when the difference between the inlet temperature of the diesel oxidation catalyst and the outlet temperature of the NOx occlusion reduction catalyst has reached or fallen below the threshold and a minimum rich-prohibited period or more has passed.

3. The method of controlling the exhaust gas aftertreatment device according to claim 2, wherein the rich reduction is carried out when the difference between the inlet temperature of the diesel oxidation catalyst and the outlet temperature of the NOx occlusion reduction catalyst exceeds the threshold and a maximum rich-prohibited period has passed since the difference has exceeded the threshold.

4. A method of controlling an exhaust gas aftertreatment device, the exhaust gas aftertreatment device including an exhaust pipe injector provided in an exhaust pipe of an engine, a diesel particulate filter connected to the exhaust pipe downstream of the exhaust pipe injector, a selective catalytic reduction catalyst connected to the exhaust pipe downstream of the diesel particulate filter, a diesel oxidation catalyst connected to the exhaust pipe downstream of the selective catalytic reduction catalyst, and a urea solution spray nozzle provided in the exhaust pipe upstream of the selective catalytic reduction catalyst, the exhaust gas aftertreatment device being configured to reduce and purify NOx with the selective catalytic reduction catalyst, the method comprising:

raising an exhaust gas temperature when a predetermined amount of particulate matter has accumulated in the diesel particulate filter so as to carry out particulate matter regeneration while prohibiting urea solution spray from the urea solution spray nozzle; and continuing to prohibit the urea solution spray, after the particulate matter regeneration finishes, until a difference between inlet and outlet temperatures of the selective catalytic reduction catalyst reaches or falls below a threshold.

5. The method of controlling the exhaust gas aftertreatment device according to claim 4, wherein the threshold is set within a range of 80 to 100 degrees C., and the urea solution spray is carried out when the difference between inlet and outlet temperatures of the selective catalytic reduction catalyst has reached or fallen below the threshold and a minimum urea-solution-spray-prohibited period or more has passed.

6. The method of controlling the exhaust gas aftertreatment device according to claim 5, wherein the urea solution spray is carried out when the difference between the inlet and outlet temperatures of the selective catalytic reduction catalyst exceeds the threshold and a maximum urea-solution-spray-prohibited period has passed since the difference has exceeded the threshold.

7. The method of controlling the exhaust gas aftertreatment device according to claim 1, wherein the NOx occlusion reduction catalyst is a lean NOx trap or a NOx storage reduction catalyst.

8. The method of controlling the exhaust gas aftertreatment device according to claim 1, wherein said raising an exhaust gas temperature to carry out particulate matter regeneration includes raising the exhaust gas temperature to 600 degrees C., and said further raising the exhaust gas temperature to carry out the sulphur purge includes raising the exhaust gas temperature to at least 605 degrees C.

9. The method of controlling the exhaust gas aftertreatment device according to claim 2, wherein said minimum rich-prohibited period is one minute.

10. The method of controlling the exhaust gas aftertreatment device according to claim 3, wherein said maximum rich-prohibited period is five minutes.

11. The method of controlling the exhaust gas aftertreatment device according to claim 4, wherein said raising an exhaust gas temperature to carry out particulate matter regeneration includes raising the exhaust gas temperature to 600 degrees C.

12. The method of controlling the exhaust gas aftertreatment device according to claim 5, wherein said minimum urea-solution-spray-prohibited period is one minute.

13. The method of controlling the exhaust gas aftertreatment device according to claim 6, wherein said maximum urea-solution-spray-prohibited period is five minutes.

* * * * *